May 29, 1923.  1,457,146
M. J. CANAVAN
AUTOMATIC HEADLIGHT TURNER
Filed Aug. 8, 1921  2 Sheets-Sheet 1
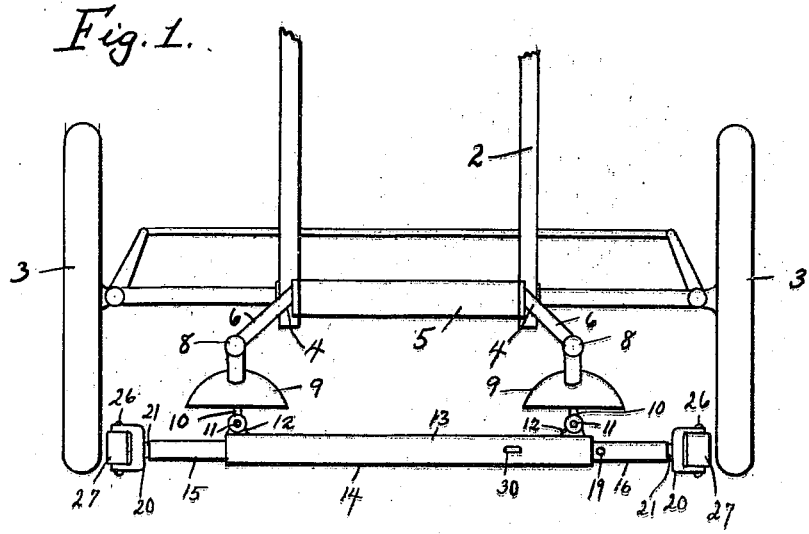
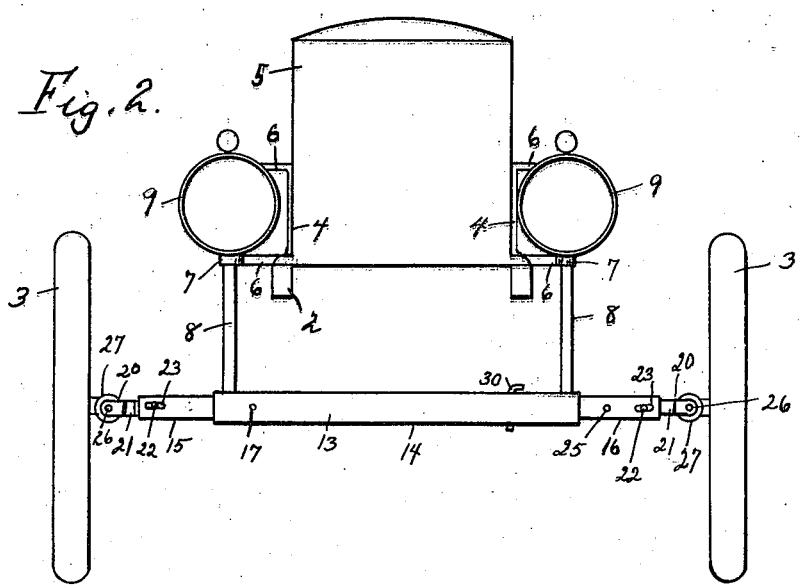
INVENTOR
Matthew J. Canavan
By W. W. Williamson, Atty.

May 29, 1923.
M. J. CANAVAN
AUTOMATIC HEADLIGHT TURNER
1,457,146
Filed Aug. 8, 1921
2 Sheets-Sheet 2
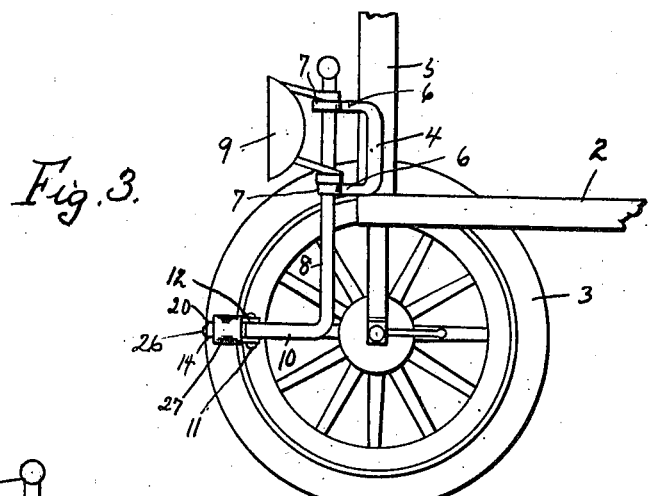
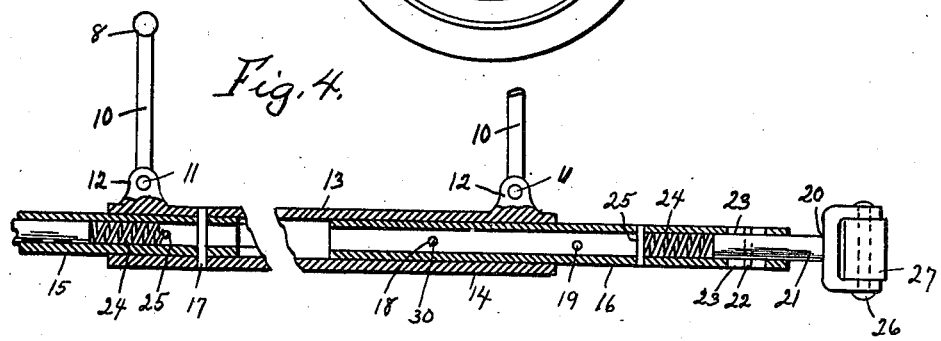
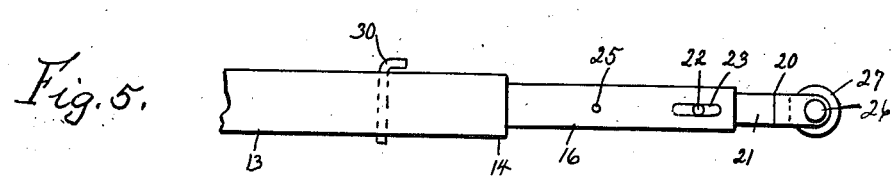
INVENTOR
Mathew J. Canavan
By W. W. Williamson, Atty.

Patented May 29, 1923.

1,457,146

UNITED STATES PATENT OFFICE.

MATTHEW J. CANAVAN, OF DUNMORE, PENNSYLVANIA.

AUTOMATIC HEADLIGHT TURNER.

Application filed August 8, 1921. Serial No. 490,469.

*To all whom it may concern:*

Be it known that I, MATTHEW J. CANAVAN, a citizen of the United States, residing at Dunmore, in the county of Lackawanna and State of Pennsylvania, have invented new and useful Improvements in an Automatic Headlight Turner, of which the following is a specification.

My invention relates to new and useful improvements in an automatic head light turner, which is particularly adapted for use with automobiles, although by slight changes in the sizes and shapes of certain parts the same can be used in conjunction with other vehicles such as trolley cars and locomotives and it has for its object to provide an exceedingly simple and effective device of this character which will cooperate with the steering wheels of a vehicle and be actuated by said wheels as the latter are moved from side to side thereby simultaneously rotating the head lights connected therewith in order that the rays of light from the lamps will be projected in the same direction as the vehicle is traveling.

Another object of the invention is to provide a device of this character that will be readily applicable to vehicles of different kinds more particularly automobiles and which may be readily and quickly adjusted in order to disengage the contact rollers from the vehicle wheels when the lamps are not in use as for instance during the daytime.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a fragmentary plan view of an automobile showing my invention applied thereto.

Fig. 2, is a front elevation thereof.

Fig. 3, is a side elevation of the same with the near side wheel removed.

Fig. 4, is an enlarged fragmentary sectional view of the reach or connecting member to which the lamps are connected, portions of said reach being left in elevation.

Fig. 5, is a bottom plan view of a portion of Fig. 4.

In carrying out my invention as here embodied, 2 represents the frame of a vehicle provided with the pivoted front wheels 3 by which the vehicle is steered and which may be of any desirable or well known construction, the same being here shown as automobile wheels having tires thereon.

To some suitable portion of the vehicle such as for instance the radiator 5 are secured brackets 4 each having a pair of horizontal arms 6 the outer ends of said arms having sockets 7 for the reception of the vertical lamp supporting standards 8 upon which are suitably mounted the head light lamps 9. From the lower ends of the standards 8 project the legs 10 at right angles to said standards and the outer or free ends of these legs are pivoted as at 11 between the ears or lugs 12 carried by the barrel 13.

The aforementioned barrel forms a part of the reach or connecting member designated as a whole by the numeral 14 and within each end of said barrel is mounted a sleeve one of which is designated by the numeral 15 and the other by the numeral 16. The sleeve 15 is preferably fixed in place by a suitable fastening device such as a rivet 17, while the sleeve 16 may be held in either of two adjusted positions by means of a pin 30 passing through suitable holes in the barrel and one of the holes 18 or 19 in said sleeve 16.

In the outer end of each sleeve is slidably mounted a fork 20 the shank 21 thereof projecting into the sleeve and being held against rotation in any suitable manner, one means for accomplishing such a result being here shown and consisting of a pin 22 carried by the shank 21 with the ends thereof projecting into slots 23 in the sleeve and said forks are normally forced outward by means of the coil springs 24 engaging the inner ends of the shanks 21 as the movable members and suitable stops 25, such as pins, as the stationary members, said pins being fixed in the sleeves 15 and 16.

With the bifurcated portion of each fork is mounted a suitable axle 26 on which is revolubly journalled a roller 27, said rollers when in their operative positions lying in close proximity to or in contact with the wheels 3.

As the wheels 3 are moved from side to side during the steering operations one of said wheels will be moved into contact with one of the rollers which will thus move the connecting member or reach 14 to one side according to the direction in which the vehicle is being steered and as said reach is moved the outer ends of the legs 10 will be likewise moved to one side, thus rotating the standards 8 in their brackets which will turn the lamps 9 to direct the rays of light in the direction traveled by the vehicle and in order to maintain the lamps in a given elevation I have shown the lamp bracket arms which are fastened to the standards resting upon the arms of the brackets.

When the lamps are not in use, as for instance during the daytime, the pin 30 may be withdrawn from the hole 18 in the sleeve 16 and said sleeve projected into the barrel 13 until the hole 19 is properly positioned for the reception of the pin 30. When thus adjusted the reach may be centered relative to the wheels 3 when they are traveling in a straight line after which any movement of said wheels from side to side during the steering operations will not actuate the reach and therefore the lamps will remain in a stationary position.

Of course I do not wish to be limited to the exact details of construction as herein shown as these may be varied within the limits of the appended claims without departing from the spirit of my invention.

Having thus fully described my invention, what I claim as new and useful is:—

1. An automatic head light turner comprising in combination with a vehicle and the front wheels thereof, brackets secured to the vehicle, lamp standards journalled in said brackets, legs projecting from the lower ends of said standards at right angles thereto, a barrel having lugs to which the ends of said legs are pivoted, a sleeve fixed in one end of said barrel, another sleeve adjustably mounted in the opposite end of said barrel, means for holding said last named sleeve in different positions, forks slidably mounted in the outer ends of said sleeves, means for normally forcing said forks outward, and rollers journalled in said forks for coaction with the vehicle wheels.

2. In a device of the character stated, the combination with a vehicle and the front wheels thereof, of a pair of brackets secured to the vehicle, each bracket consisting of a pair of horizontal arms each of said arms having a socket, vertical standards each having a lamp mounted thereon, journalled in the sockets of said brackets, legs projecting from the lower ends of said standards at right angles thereto, a barrel having lugs to which the outer ends of said legs are pivoted, a sleeve mounted in one end of said barrel, means for fastening said sleeve in the barrel, another sleeve slidably mounted in the opposite end of the barrel, said sleeve having a plurality of holes therethrough, a pin passing through the barrel and through said holes for holding the same in its adjusted position, forks slidably mounted in the outer ends of said sleeves, means for preventing the rotation thereof, pins mounted in said sleeves, springs located between the last named pins and the shanks of said forks to normally force said forks outward, an axle mounted in the bifurcated portion of each fork, and rollers journalled on said axles and adapted to coact with the vehicle wheels whereby said rollers, their forks, the sleeves and barrel will be moved from side to side during the steering operations of the vehicle wheels for rotating the lamps to direct the rays of light in the direction of travel of the vehicle.

3. The combination with an automobile including a frame and steering wheels, of brackets secured to the frame, lamp standards journalled in said brackets, legs projecting from said standards, a barrel pivoted to the outer ends of said legs and movable therewith, sleeves in said barrel having their outer ends projecting beyond the ends of the barrel and spring pressed roller supporting means slidably mounted in the outer ends of said sleeves.

In testimony whereof, I have hereunto affixed my signature.

MATTHEW J. CANAVAN.